United States Patent [19]

Zehnder

[11] Patent Number: 4,579,065

[45] Date of Patent: Apr. 1, 1986

[54] ARRANGEMENT OF STIFFENING ELEMENTS

[75] Inventor: Jürg Zehnder, Uitikon, Switzerland

[73] Assignee: Swiss Aluminium Ltd., Chippis, Switzerland

[21] Appl. No.: 513,635

[22] Filed: Jul. 14, 1983

[30] Foreign Application Priority Data

Jul. 23, 1982 [CH] Switzerland ............... 4509/82

[51] Int. Cl.⁴ .............................. B61D 17/00
[52] U.S. Cl. ..................... 105/411; 105/406 R; 105/419
[58] Field of Search ............. 105/406 R, 409, 410, 105/411, 417, 418, 419, 413, 414

[56] References Cited

U.S. PATENT DOCUMENTS

| | | | |
|---|---|---|---|
| 776,149 | 11/1904 | Simonton | 105/418 |
| 1,299,991 | 4/1919 | Murphy | 105/406 R |
| 2,464,080 | 3/1949 | Hankins | 105/411 |
| 2,473,946 | 5/1945 | Hammerstrom | 105/414 |
| 2,801,597 | 8/1957 | Ecoff | 105/414 |
| 3,319,583 | 5/1967 | Gutridge | 105/414 |

Primary Examiner—Robert B. Reeves
Assistant Examiner—Dennis C. Rodgers
Attorney, Agent, or Firm—Bachman & LaPointe

[57] ABSTRACT

An arrangement of stiffening elements, in particular for a railway goods car with a longitudinal beam on both sides of a trough under a base plate which supports sidewalls connected by a lower truss and end walls of a car superstructure with upper truss, the interior (J) of the car superstructure featuring a plurality of cross-ties. Said arrangement is such that a cross beam is connected to an end face of the trough and to the base plate, the longitudinal beam meeting said cross beam and forming an abutting surface with it. Resting on the cross beam are two lengths of hollow sections which project a length (i) into the lower truss. The trough features a floor and an additional floor which are joined by strips of material in a corrugated manner. The cross-ties are tubular shaped and feature towards their ends squashed regions which are accommodated in pairs of fish-plates to which the said cross-ties are releasably attached by suitable facilities.

8 Claims, 5 Drawing Figures

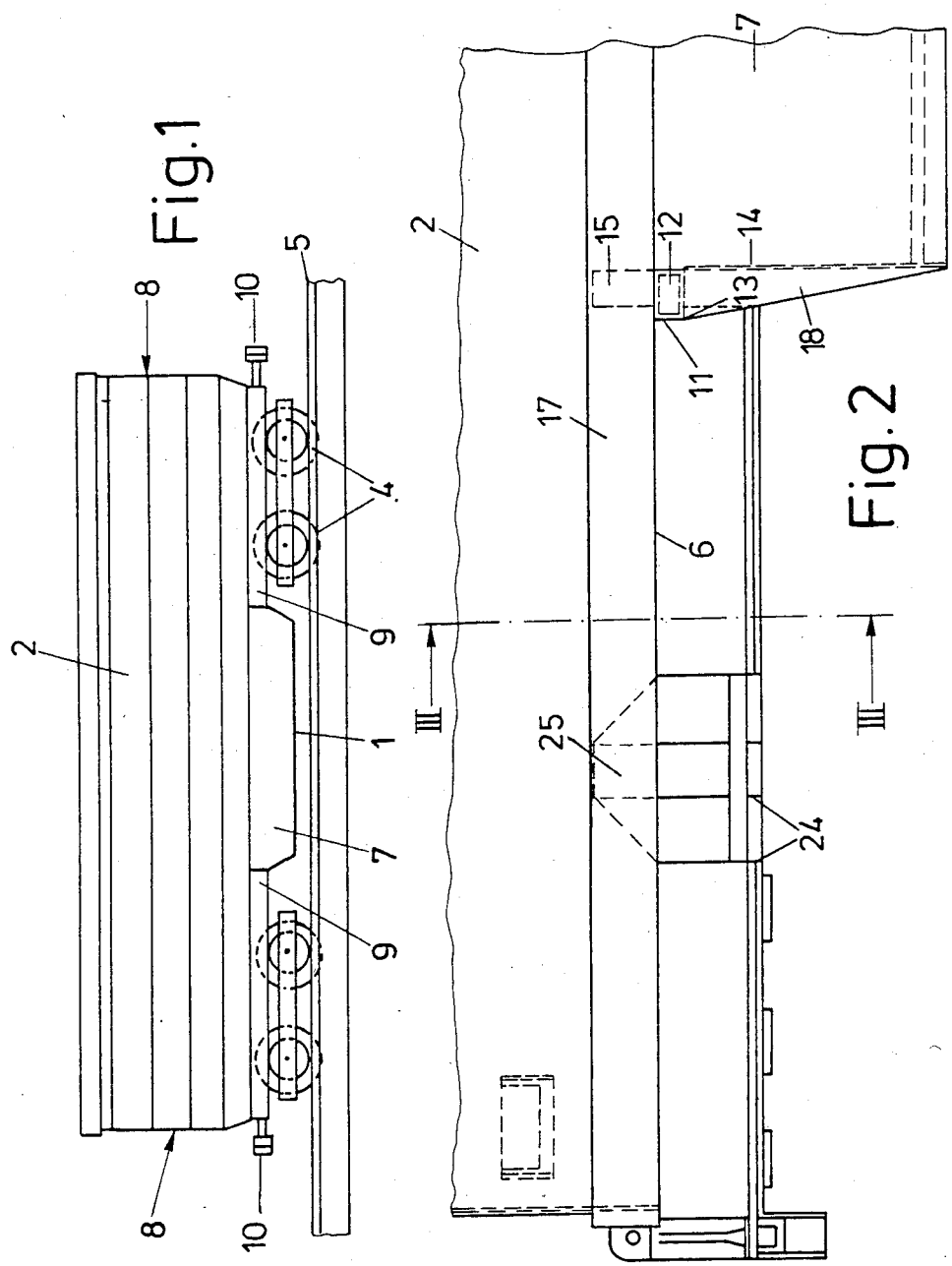

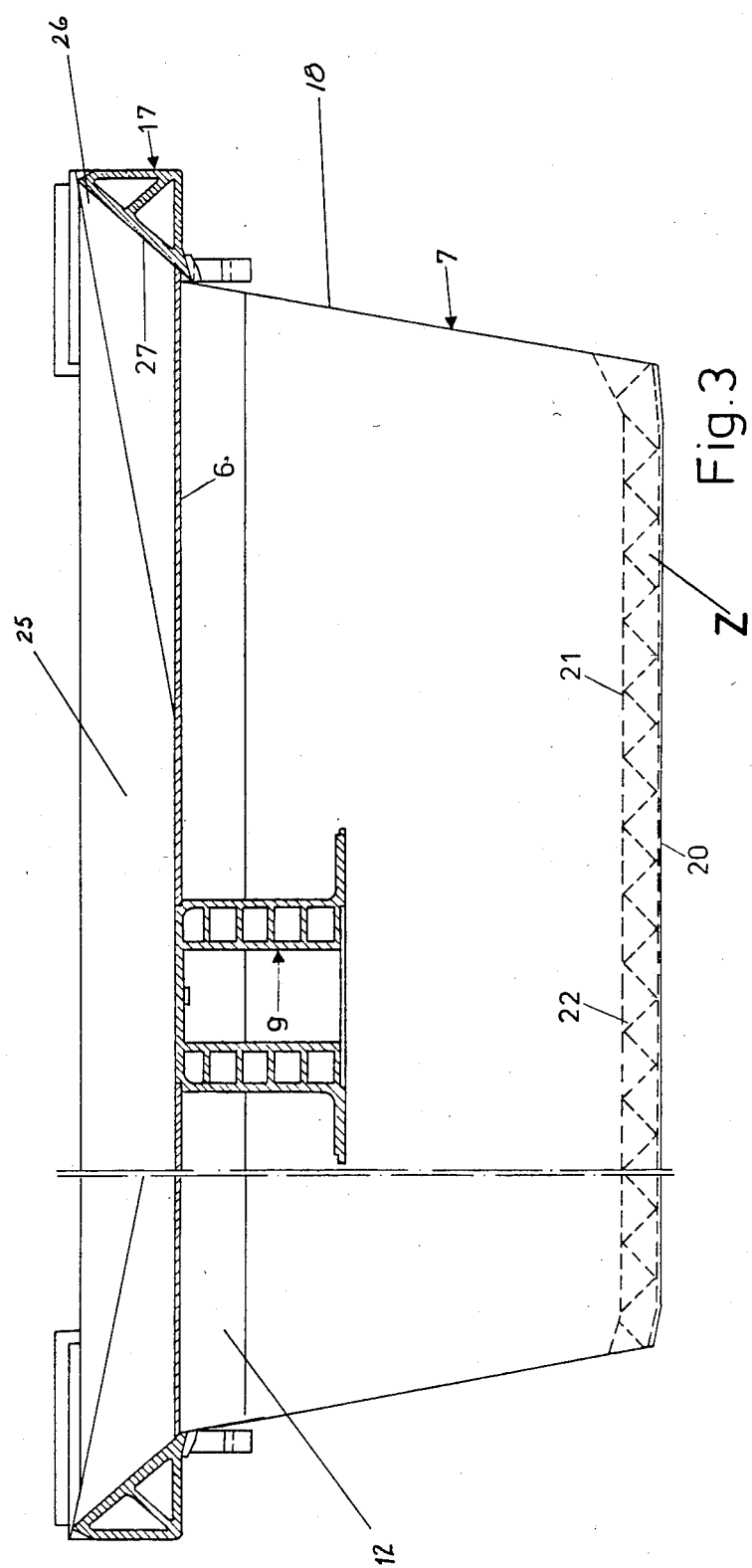

ARRANGEMENT OF STIFFENING ELEMENTS

BACKGROUND OF THE INVENTION

The invention relates to an arrangement of stiffening elements, in particular for a railway goods car with a longitudinal beam on both ends of a trough under a base plate which supports sidewalls connected by a lower truss and end walls of a car superstructure with upper truss, the interior of the car superstructure featuring a plurality of cross-ties.

Known railway goods cars without a trough in the floor feature a continuous longitudinal beam which runs under the base plate and is used to carry the coupling elements at its ends. These longitudinal beams accommodate tensile and compression forces which are created especially during coupling.

In cars with a trough in the floor the longitudinal beam is divided into two parts; each part terminates at the trough. The forces acting on the longitudinal beam are as a rule transmitted and taken up by the end wall of the trough. This arrangement has, in the long run, been found unsatisfactory. Fatigue cracks form at the junction between the longitudinal beam and the trough; consequently the cars are frequently in need of repair.

Also the cross-ties, which are particularly important for shape stability during and after loading suffer the considerable disadvantage in that up to now these cross the interior of the car and are joined together where they cross, and also that these ties are not usually releasably fixed to the upper and lower trusses.

The object of the present invention is therefore to overcome the disadvantages of the known arrangements for stiffening railway cars, and to improve the distribution of forces acting on the car.

SUMMARY OF THE INVENTION

The foregoing objects are achieved by way of the invention wherein a cross beam is connected to an end face of the trough and to the base plate, and a longitudinal beam meets the said cross beam and forms an abutting surface with it. As a result the forces acting on the longitudinal beam are no longer transmitted to the end wall of the trough but are borne by the cross beam which is in turn mounted into the lower truss. This way an orthotropic plate is produced together with the lower truss, which greatly improves the distribution of forces.

On the cross beam are preferably two lengths of hollow section which project a certain distance into the lower truss. The cross beam itself is covered over at its ends by cover sheets attached to the trough.

A further form of stiffening is provided by having the bottom of the trough in the form of a sandwich-like arrangement of plates. A false bottom is provided above the actual bottom and both of these are joined by strips of material arranged in the manner of corrugated sheet.

An additional improvement in the distribution of forces is provided by a section on the longitudinal beam at about its mid point, the end edges of the said section also, similar to the cross beam, being attached to the lower truss. The connections to the longitudinal beam itself are made by outward projecting strengthening ribs.

A new arrangement of cross-ties inside the superstructure has been developed for stiffening the sidewalls; also the fixing of these cross-ties to the sidewalls has been improved. To this end the cross-ties are tubular shaped and feature squashed, flattened regions towards their ends. This flattened regions is inserted in fish-plates provided in the superstructure and joined there for example by means of a bolt. This way it is possible to disconnect cross-ties and mount them as required in other parts of the car. This means that it is no longer necessary to employ cross-ties to stiffen a particular part of the car. For this it suffices to have one cross-tie as it can be deployed much more flexibly.

If railway cars without a floor trough are employed, then it is sufficient to connect the upper trusses of the car sidewalls by horizontal cross-ties and the upper and lower trusses by further diagonal cross-ties which are spaced apart and slope alternately from the left up and the right up. In cars with troughs a cross-tie is additionally provided joining both lower trusses in the region of the trough.

BRIEF DESCRIPTION OF THE DRAWINGS

Further advantages, features and details of the invention are revealed in the following description of exemplified embodiments and with the help of the drawings wherein, FIG. 1: Is a schematic front elevation of a railway car.

FIG. 2: Is an enlarged view of part of the car base shown in FIG. 1.

FIG. 3: Is an enlarged cross-sectional view of the car base shown in FIG. 2 along line III—III.

DETAILED DESCRIPTION

Figure 4:
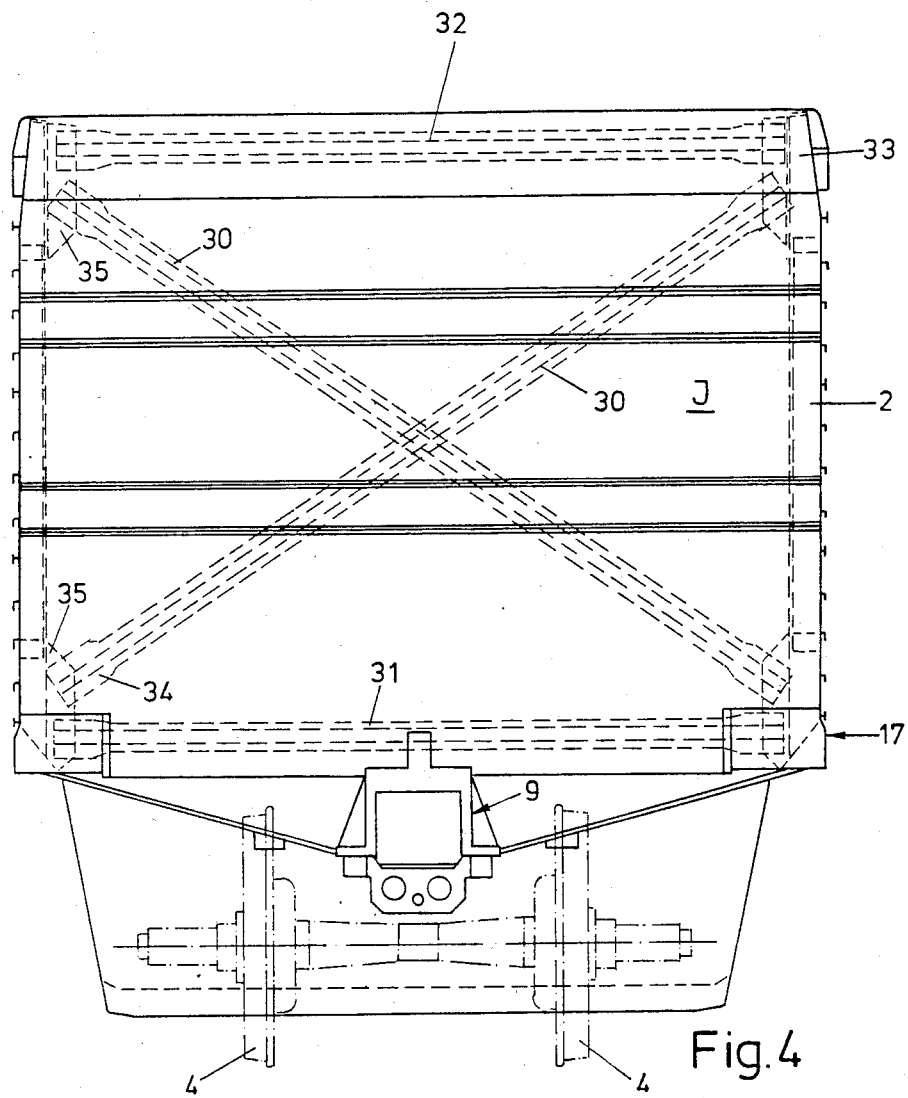
FIG. 4: Is an end view of a railway car.

A railway car, for goods transportation in particular, features, as shown in FIG. 1, a container-shaped superstructure 2 mounted on a base 1, and moves on wheels 4 on rails 5.

The base 1 is made up essentially of a base plate 6 (FIG. 3) which is interrupted approximately in the middle of the car by a trough 7 in the floor. Longitudinal beams 9 run from the trough 7 to each end wall 8 of the car. Coupling elements 10 project out of the longitudinal beams 9 at each end.

Figure 5:
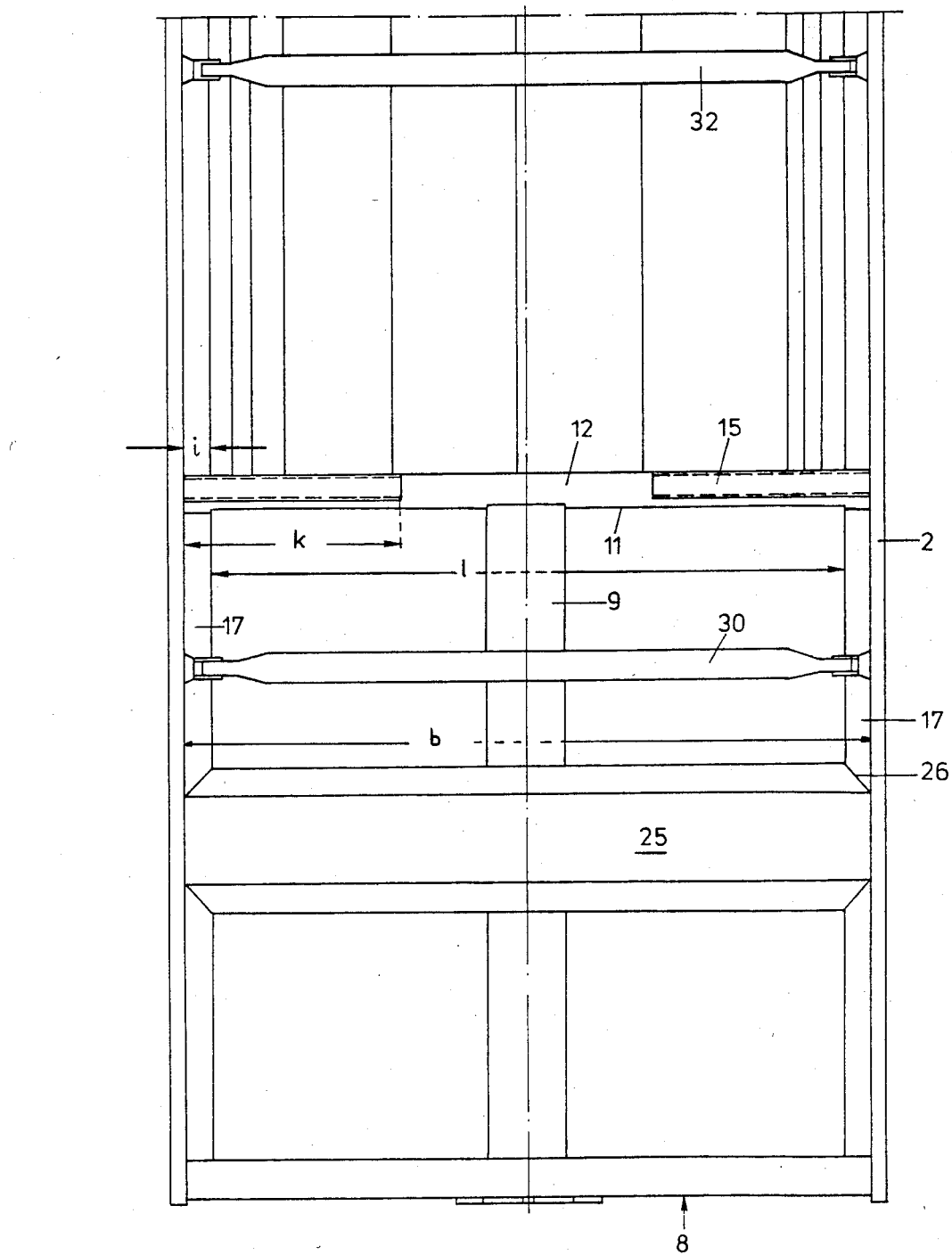
FIG. 5: Is a plan view of part of railway car.

As shown in FIG. 2 an end face 11 of a longitudinal beam 9 meets, and forms an abutting surface 13 with a cross beam 12 of length 1 which is in the form of a hollow section, said cross beam 12 being situated on an end wall 14 of the trough 7 below base plate 6 and running the whole breadth b thereof (FIG. 5). Mounted on the cross beam 12 are in turn two hollow sections 15 of length k which project a length i into a lower truss 17 of the superstructure 2. The cross beam 12 is covered over at both ends by a cover sheet 18 on the trough 7.

As shown in FIG. 3 an additional floor 21 is provided on top of the floor 20 of trough 7. Corrugated like strips of material 22 are provided in the space Z between the floors 20 and 21 thus considerably strengthening the trough 7.

At about the middle of the longitudinal beam 9 are strengthening ribs 24 which project out perpendicularly and are connected to a section 25 which in cross section is trapezium-shaped. The strengthening ribs 24 terminate immediately before the, in cross section, triangular truss 17 (FIG. 3) while section 25 along with the longitudinal beam 9 rests on and has its edge 26 attached to the hypotenuse 27.

As shown in FIG. 4 a plurality of cross-ties 30 run diagonally inside the car interior J from the lower truss 17 to the upper truss 33, and do so alternately and spaced apart from the left upwards and the right upwards. Further cross-ties 31 and 32 connect the opposite lying lower trusses 17 and upper trusses 33 respectively. The cross-ties 30, 31 and 32 are tubular in shape and towards the ends feature compressed regions 34 which are placed between fish-plates 35 and e.g. bolted securely in place by means of bolts which are not shown here.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An arrangement of stiffening elements for a railway car having a longitudinal beam on both ends of a trough under a base plate which supports side-walls connected by a lower truss and end-walls of a car supersturcture with an upper truss, the interior of the car superstructure featuring a plurality of cross-ties, wherein a cross beam is connected to an end face of said trough and to said base plate, said longitudinal beam meeting said cross beam and forming an abutting surface with it further including two lengths of a hollow section, said lengths of a hollow section rest on said cross beam and project a length (i) into said lower truss.

2. An arrangement according to claim 1 wherein said cross beam toward the ends thereof is covered over by cover sheets connected to said trough.

3. An arrangement according to claim 1 wherein said trough has a first floor and above that a second floor, both floors being joined by strips of material in a corrugated manner.

4. An arrangement according to claim 10 wherein a section rests on said longitudinal beam at about the mid-point thereof, said section being connected at its ends to said lower trusses and connected to strengthening ribs jutting out of said longitudinal beam.

5. An arrangement according to claim 1 wherein tubular shaped cross-ties running diagonally inside said car have squashed regions towards their ends which are accommodated in pairs of fish-plates mounted on said side-walls to which the said cross-ties are releasably attached by suitable facilities.

6. An arrangement according to claim 5 wherein said facilities for releasably attaching the fish-plates and the squashed ends of the cross-ties are bolts passing through the same.

7. An arrangement according to claim 5 wherein at least some of said cross-ties are horizontal cross-ties which connect the upper trusses of the car side-walls and some other cross-ties, spaced apart and running diagonally and alternately so across the interior of the car, connect the upper trusses with the lower trusses.

8. An arrangement according to claim 7 wherein the remaining cross-ties are provided near the trough and connect both lower trusses.

* * * * *

UNITED STATES PATENT AND TRADEMARK OFFICE
CERTIFICATE OF CORRECTION

PATENT NO. : 4,579,065
DATED : April 1, 1986
INVENTOR(S) : JURG ZEHNDER

It is certified that error appears in the above-identified patent and that said Letters Patent are hereby corrected as shown below:

Column 3, claim 1, line 25, change "sturcture" to read ---structure---.

Column 4, claim 4, line 8, change the dependency from "claim 10" to ---claim 1---.

Signed and Sealed this

Eighth Day of July 1986

[SEAL]

Attest:

Attesting Officer

DONALD J. QUIGG

Commissioner of Patents and Trademarks